US012657553B2

(12) United States Patent (10) Patent No.: US 12,657,553 B2
Völker (45) Date of Patent: Jun. 16, 2026

(54) LOADING METHOD AND LOADING STATION FOR CONVEYING CONTAINERS

(71) Applicant: Dürkopp Fördertechnik GmbH, Bielefeld (DE)

(72) Inventor: Sigurd Völker, Vlotho (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 96 days.

(21) Appl. No.: 18/613,817

(22) Filed: Mar. 22, 2024

(65) Prior Publication Data

US 2024/0338654 A1 Oct. 10, 2024

(30) Foreign Application Priority Data

Apr. 4, 2023 (DE) ..................... 10 2023 203 126.4

(51) Int. Cl.
G06Q 10/087 (2023.01)

(52) U.S. Cl.
CPC .................................. G06Q 10/087 (2013.01)

(58) Field of Classification Search
CPC ........... G06Q 10/087; B07C 5/34; B07C 5/02
See application file for complete search history.

(56) References Cited

U.S. PATENT DOCUMENTS 6,701,001 B1 * 3/2004 Kenneway ............ B07C 5/3422
382/141
8,335,585 B2 * 12/2012 Hansl ................... B65G 1/1378
700/214

2010/0213031 A1 * 8/2010 Krech ..................... B65G 54/02
198/574
2014/0166553 A1 * 6/2014 Enenkel ................. B65G 67/08
198/363
2018/0154399 A1 6/2018 Wagner et al.
2018/0333749 A1 * 11/2018 Wagner ................... B65B 5/106

FOREIGN PATENT DOCUMENTS

AT 404717 B 2/1999
DE 102009011230 A1 9/2010
DE 102018201675 A1 8/2019
EP 1690811 A1 8/2006
(Continued)

OTHER PUBLICATIONS

European Patent Office Extended Search Report for Application No. 24164542.3 dated Aug. 2, 2024 (12 pages including English machine translation).

(Continued)

*Primary Examiner* — Garcia Ade

(74) *Attorney, Agent, or Firm* — Michael Best & Friedrich LLP

(57) ABSTRACT

A loading method for conveying containers with goods from a stream of goods includes feeding the stream of goods to a separation point. The stream of goods includes first goods and second goods. The first goods are admissible for loading into the conveying containers and the second goods are inadmissible for loading into the conveying containers. The method further includes separating the goods, automatically identifying the separated goods, discharging the second goods from the stream of goods, and loading the conveying containers with the first goods.

17 Claims, 1 Drawing Sheet

(56) References Cited

FOREIGN PATENT DOCUMENTS

| EP | 4115994 | A1 | 1/2023 |
| WO | 2018200503 | A1 | 11/2018 |
| WO | 2020004919 | A1 | 1/2020 |

OTHER PUBLICATIONS

European Patent Office Examination Report for Application No. 24164542.3 dated Dec. 16, 2025 (8 pages including English machine translation).
German Patent Office Examination Report for Application No. 102023203126.4 dated Dec. 5, 2023 (9 pages including statement of relevance).

* cited by examiner

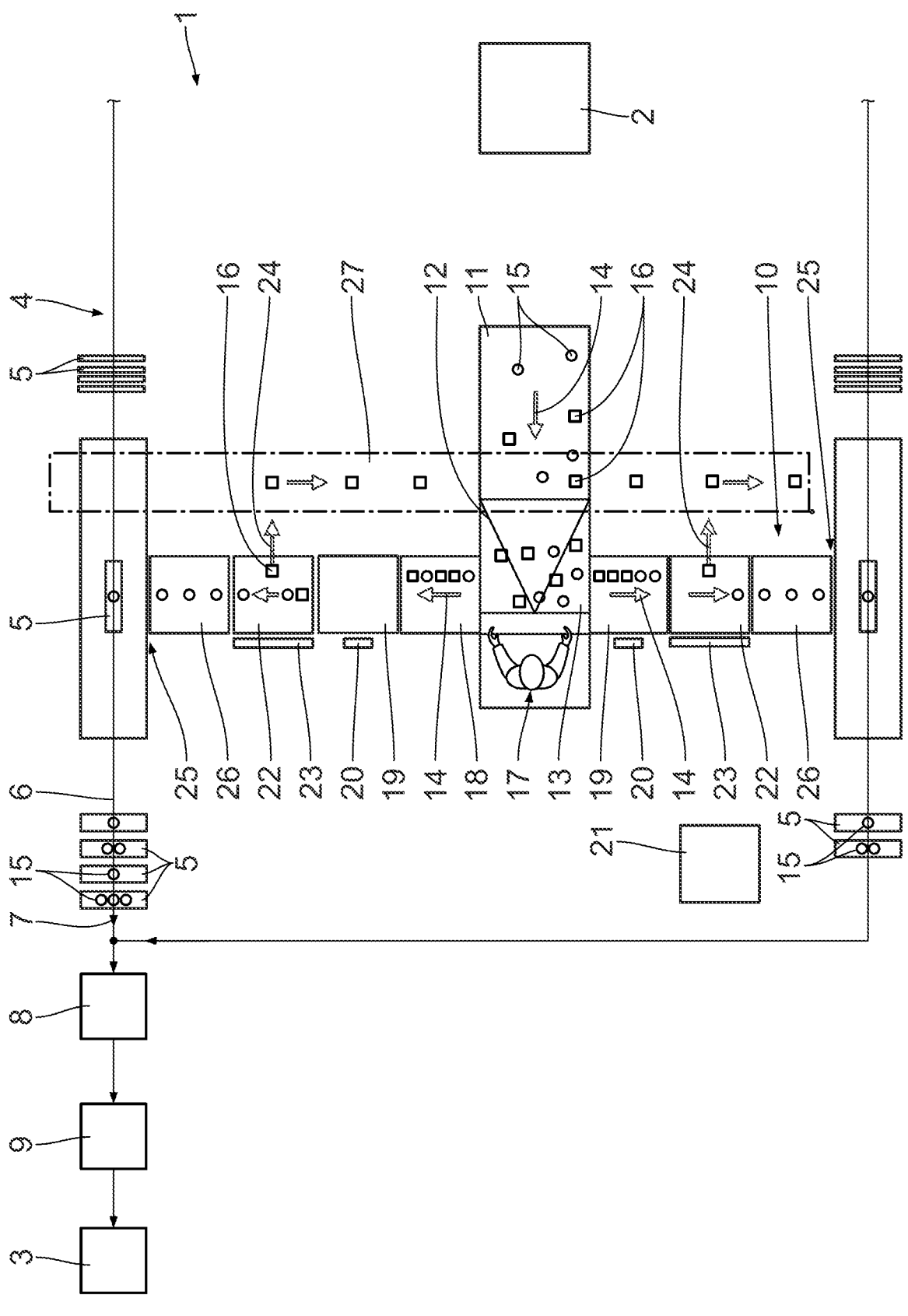

LOADING METHOD AND LOADING STATION FOR CONVEYING CONTAINERS

CROSS-REFERENCES TO RELATED APPLICATIONS

This application claims priority, under 35 U.S.C. § 119, to German Patent Application Serial No. DE 10 2023 203 126.4, filed Apr. 4, 2023, the content of which is incorporated herein by reference in its entirety as if fully set forth herein.

FIELD

The disclosure relates to a loading method and a loading station for conveying containers.

In conveyor facilities in which articles are conveyed, sorted and possibly commissioned in conveying containers, goods may be present that are declared inadmissible for further conveying, for example because they are not suitable or not intended for processing in the conveyor facility and/or at the respective processing time. Various solutions are known from the prior art for handling such inadmissible goods. For example, all goods are loaded into the conveying containers and divided into admissible and inadmissible goods in commissioning cycles. This leads to an increased commissioning effort.

Alternatively, all goods are conveyed to a packing place using the conveying containers and the inadmissible goods are sorted out there. This solution involves additional sorting effort at the packing place and imposes an avoidable conveying load on the conveyor facility.

Alternatively, the goods can be separated immediately after the incoming goods zone. This separation reduces the efficiency of the conveying method due to interruptions and slows down the overall process considerably.

The above problem-solving approaches either require a great deal of technical effort, create complexity and/or reduce the efficiency of the overall process.

SUMMARY

It is an object of the present disclosure to improve the conveyance of a stream of goods which contains inadmissible goods, in particular by enabling inadmissible goods to be discharged in an uncomplicated and in particular automated manner, so that in particular the efficiency of the conveyance of goods, i.e., the goods throughput rate, is not impaired.

According to the disclosure, this object is achieved by a loading method for conveying containers with goods from a stream of goods comprising the method steps of feeding the stream of goods to a separation point, wherein the stream of goods comprises first goods and second goods, wherein the first goods are admissible for loading into the conveying containers and wherein the second goods are inadmissible for loading into the conveying containers, separating the goods, automated identification of the separated goods, discharging the second goods from the stream of goods, and loading the conveying containers with the first goods and a loading station for conveying containers comprising a feed unit for feeding a stream of goods comprising first goods and second goods, wherein the first goods are admissible for loading into the conveying container and wherein the second goods are inadmissible for loading into the conveying container, a separation point for separating the goods, arranged downstream of the feed unit in the goods conveying direction, an identification point with an identification unit for the automated identification of the separated goods, a discharge point for discharging the second goods from the stream of goods, a loading point coupled to the discharge point in terms of conveying technology for loading the conveying containers with the first goods.

According to the disclosure, it has been recognized that inadmissible goods are sorted out of a stream of goods before the goods are loaded into conveying containers. The goods that are fed unsorted and not separated as a stream of goods to a separation point are first separated and then automatically identified. First goods that are admissible for loading into the conveying containers are loaded into the conveying containers. Second goods that are inadmissible for loading into the conveying containers are discharged from the stream of goods. The second goods are qualified as inadmissible in particular because they are not suitable or not intended for further conveying in the conveyor facility and/or at the time they are identified in the conveyor facility. Inadmissibility occurs, for example, if the second goods have inadmissible characteristics such as dimensions that are too large or too small, weight that is too large or too small, unreadability of identification codes and/or RFID tags and/or item-specific properties that are inadmissible for conveying, which are stored and/or saved in the master data of the second goods in particular, such as fragility, pressure sensitivity, sharp edges, dangerousness during transport, strong magnetic properties, hazardous substances, for example lithium-ion batteries. Additionally or alternatively, the second goods may also be inadmissible because the goods are not yet to be processed at the time when they are fed to the separation point, but are to be processed at a later time. This is particularly the case if the goods are processed in a batch-oriented manner. This means that the goods for groups of orders are processed in a common wave. If a second set of goods does not belong to the active wave currently being processed in the system, it can be qualified as inadmissible.

The second goods are discharged from the stream of goods before the conveying containers are loaded. In particular, this means that a reduced stream of goods reaches a loading point after the discharge. The second goods are discharged after separation. In particular, it has been recognized that a separation capacity, i.e. the throughput rate of the goods during separation, is greater than a loading capacity, i.e. the throughput rate of the goods during loading of the conveying containers. In particular, the separating capacity is at least 1.05 times the loading capacity, in particular 1.1 times, in particular 1.2 times, in particular at least 1.5 times and in particular at least 2.0 times. Although the goods are separated and the second goods are discharged from the stream of goods before loading, the loading capacity is not reduced. The stream of goods arriving at the loading point, reduced by the second goods, has a goods density that enables loading at the maximum possible loading capacity provided by the loading point. The conveying containers can be loaded at the maximum theoretically possible loading capacity. Sorting out the second goods is easily integrated into the stream of goods, can be implemented using the technical facilities typically available in a conveyor facility anyway and does not create any additional complexity.

The conveying containers are in particular hanging bags which are transported in a suspended manner in an overhead conveyor facility. Such hanging bags are known, for example, from DE 10 2018 201 675 A1, which can be conveyed separately along a conveyor rail, in particular by means of roller adapters. Reference is made to EP 1 690 811 A1 with regard to the roller adapter, in particular its structure and functionality. The hanging bags allow the goods to be conveyed flexibly and separately. In particular, the hanging bags are suitable for conveying different types of articles. In particular, the hanging bags can be opened and/or closed in an automated manner.

A loading method in which loading is carried out in an automated manner, in particular controlled by a control unit, enables an increased degree of automation. After loading, the loaded conveying containers are transported away, in particular in an automated manner. In particular, the loading process, i.e. the delivery of the first goods into the conveying containers, is detected automatically, in particular by sensors, in particular optically, in particular by means of a light barrier and/or by means of a light curtain.

A loading method in which the first goods are delivered into the conveying containers by means of a loading conveying system enables automated loading of the conveying containers.

Alternatively, it is possible to load the conveying containers manually.

A loading method in which the conveying containers to be loaded are provided at a loading point, in particular automatically opened, reduces interruptions and/or downtimes in the stream of goods during loading. The conveying containers to be loaded are provided at a loading position for the loading process and, in particular, are opened automatically. Alternatively, the conveying containers can also be opened manually.

A loading method in which the conveying containers are each loaded with exactly one first product simplifies the subsequent handling and in particular the sorting of the first goods for a commissioning process. In particular, the first goods can be conveyed and handled separately in an overhead conveyor facility. Targeted conveying of the first goods in the overhead conveyor facility is thereby improved.

Alternatively, it is possible to transport a plurality of first goods in one conveying container. For example, it may be advantageous to transport a plurality of identical first goods in one conveying container. In this case, the items are loaded separately. Alternatively, a plurality of different first goods can also be conveyed in one conveying container. It is advantageous if the different goods are allocated to one and the same order, for example. In this case, loading is carried out in an order-orientated manner.

Manual separation is efficient. It has been recognized that the manual separation capacity of an operator is greater, and in particular significantly greater, than an automated detection capacity, the discharge capacity and/or the loading capacity. In particular, this makes it possible to connect multiple identification points to the separation point, which are arranged parallel to each other. The stream of goods arriving at the separation point can be divided among multiple identification points, to each of which a discharge point and a loading point are connected. This allows the overall throughput rate for the loading method to be scaled and thus increased.

Alternatively, mechanical and in particular automated separation is also possible, in particular by means of a handling apparatus, for example in the form of an industrial robot. Such a method is possible in particular in a fully automated manner. Human interaction can be dispensed with. This is particularly advantageous in safety-relevant environments and/or environments that are dangerous or hazardous to people's health.

Automated classification of the goods increases the degree of automation.

Classification of the goods on the basis of goods characteristics, in particular at least one dimension and/or mass, and/or on the basis of an identification code, in particular a barcode, QR code and/or a readable memory chip provides an increased classification capacity. The identified goods are classified on the basis of their characteristics, in particular on the basis of value tables, which may be stored in a control unit, for example. In addition or alternatively, the classification can be carried out using unique identification codes, in particular instantaneously, because the admissibility of the goods is part of the goods characteristics, which is contained in the identification code.

A loading method in which the discharging of the second goods from the stream of goods is carried out in an automated manner provides an increased degree of automation. In particular, the overall throughput rate can be increased as a result.

A loading method in which the discharged second goods are conveyed away by means of a discharge conveying system avoids a backlog of discharged goods and thus an impairment of the loading method itself. In particular, a conveyor belt is used as a discharge conveying system for the discharged second goods, which simplifies automated discharge. Alternatively or additionally, manual removal of the discharged goods is also possible, for example by means of conveying containers, roller containers and/or mesh boxes. Automated discharge is also conceivable using autonomous vehicles.

A loading station according to the disclosure has the advantages of the loading method, reference to which is hereby made.

An identification unit is arranged at the identification point, which serves to identify the separated goods in an automated manner. The identification unit simplifies identification of the goods, in particular according to individual criteria such as dimensions, in particular length, width and/or height or diameter, shape of the goods, weight of the goods, article number and/or an identification code. The identification unit is in particular an optical sensor, in particular a camera, in particular a camera system for three-dimensional goods identification, an integrated scale and/or a reading device for automated reading of the identification code. The reading device is in particular a barcode reader, a QR code reader and/or a transponder for reading an RFID memory chip.

The loading station according to the disclosure comprises the feed unit for feeding the stream of goods, a separation point arranged downstream of the feed units in the goods conveying direction, at which the goods are separated, and a discharge point, coupled in terms of conveying technology in particular to the identification point, at which the second goods are discharged from the stream of goods. A loading point is coupled to the discharge point in terms of conveying technology, at which loading point the conveying containers are loaded with the first goods.

A coupling in terms of conveying technology of the separation point enables buffering of goods between the identification point and the separation point. The coupling in terms of conveying technology takes place in particular by means of a conveyor belt, which is also referred to as a buffer belt.

Alternatively, it is also possible to combine the separation point and the identification point. In this case, the separation point and the identification point are integrated, in particular for reasons of space. In particular, in the combined arrangement, the identification unit is arranged directly at the separation point, in particular above a working area of the operator or a corresponding handling apparatus. In particular, the identification unit is designed in such a manner that it can identify the separated goods during separation by the operator and/or the handling apparatus. The identification process is improved in particular by the fact that the goods are brought into a defined orientation during separation, in particular to enable the identification code to be read and/or the individual criteria to be captured. A loading station of this kind is designed to be particularly space-saving. An alternative space-saving implementation is also possible if the identification point is directly adjacent to the separation point. In this case, no additional and/or separate conveying system is provided between the separation point and the identification point. In particular, it is recognized that the separation by the operator and/or a handling apparatus results in integrated conveying to the identification point anyway, so that a separate conveying system is dispensable.

A discharge conveying system arranged at the discharge point for the automated discharge of the second goods simplifies the discharge of the second goods. The discharge conveying system comprises in particular a discharge member and enables transverse conveying in a transverse direction, for example in a direction inclined at 30° or 45° with respect to the conveying direction of the stream of goods, and in particular perpendicular to the conveying direction of the stream of goods towards the loading point. This transverse conveying takes place in particular by means of a so-called pusher, which is pneumatically actuated in particular, a tilting tray, a transverse belt, a drop flap and/or a vertically swiveling conveyor. In particular, the discharge conveying system is in signal communication with the identification unit. A product identified as the second product by the identification unit can be automatically discharged by means of a corresponding control signal at the discharge conveying system.

For reasons of space, it is particularly advantageous if the identification point is integrated into the discharge point. In this case, the identification point is coupled to the discharge point in terms of conveying technology through integration. This can be achieved, for example, by the identification unit required for identification being arranged above the combined discharge/identification point, with the discharge member discharging essentially horizontally and transversely to the conveying direction of the stream of goods. This combined design is particularly space-saving. The second goods are discharged at the point at which they are detected and identified.

A loading station comprising a loading conveying system arranged at the loading point enables the automated delivery of the first goods into the conveying containers. In particular, a conveyor belt serves as the loading conveying system. In particular, this enables targeted delivery, in particular in a time-controlled manner, into the conveying containers. A loading conveying system can also be implemented as a conveyor chute in order to enable gravity-induced delivery of the first goods into the conveying containers. A conveyor chute of this type is uncomplicated in design and can in particular include a stopping member, in particular an automatically actuatable flap, in order to stop the gravity-induced conveying in a targeted manner.

In particular, the loading conveying system is in signal communication with the identification unit and/or with a feeding conveying system of the conveying containers to be loaded. This ensures, in particular, that automated loading functions without errors and, in particular, that the first goods are only delivered to the conveying containers if a conveying container to be loaded is actually available.

A loading station comprising a control unit enables, in particular, fully automated loading of the conveying containers. In particular, the control unit is in signal communication with the identification unit. In addition or alternatively, the control unit can be in signal communication, in particular bidirectionally, with the discharge conveying system, with the loading conveying system, with the feeding conveying system of the conveying containers and/or a separating unit in the form of a handling apparatus or an industrial robot.

Both the features specified above and the features specified in the following embodiment example of the loading station according to the disclosure are each suitable, either on their own or in combination with one another, for further embodying the subject-matter according to the disclosure. The respective combinations of features do not represent any restriction with regard to the further embodiments of the subject-matter of the disclosure, but are merely exemplary in character.

Additional features, advantageous designs and details of the disclosure are apparent from the following description of an embodiment example with reference to the drawing.

BRIEF DESCRIPTION OF THE DRAWING

FIG. 1 shows a schematic view from above onto a loading station for a conveyor facility in the form of an overhead conveyor facility.

DESCRIPTION OF THE PREFERRED
EMBODIMENT

A conveyor facility labelled 1 as a whole serves to convey goods from an incoming goods zone 2 to an outgoing goods zone 3. A conveying system 4 is used to convey the goods to the outgoing goods zone 3, with which conveying system 4 conveying containers 5 are conveyed in an automated and separated manner. According to the embodiment example shown, the conveying containers are hanging bags, such as those known from DE 10 2018 201 675 A1, to which express reference is hereby made with regard to their structure and function.

The hanging bags are conveyed along a conveyor rail 6 by means of a conveyor drive, not shown in detail, suspended from roller adapters, not shown in detail. With regard to the structure and function of the roller adapters, explicit reference is made to EP 1 690 811 A1. The conveyor facility 1 is in particular an overhead conveyor facility.

At least one buffer store 8 and/or at least one sorting device 9, in particular comprising several sorting lanes, can be arranged downstream of the conveying container conveying direction 7 along the conveyor rails 6. In particular, at least one packing station with at least one packing place is provided upstream of the outgoing goods zone 3 with respect to the conveying container conveying direction 7, at which packing place the goods are unloaded from the conveying containers 5 and, in particular, made ready for dispatch, in particular packed, in an order-orientated manner. Alternatively, uncomplicated sorting can be carried out, in particular by means of automatically openable conveying containers 5, in which the conveying containers 5 are conveyed via various target containers and the goods are delivered to the respective target containers on an order-related basis. Other sorting methods are also possible.

The goods ready for dispatch are dispatched from the outgoing goods zone 3 and discharged from the conveyor facility 1.

A loading station labelled 10 in total serves to feed the goods to the conveying system 4. The loading station 10 has a feed unit 11, which in particular has a feeding conveyor system. The feeding conveyor system can, for example, have a conveyor belt, in particular a belt conveyor, in order to feed goods in an automated manner, in particular separately, in bundles and/or in conveying containers. It is also conceivable that the goods, which are conveyed in a container, are unloaded, in particular tipped out, at the feed unit 11. The feed unit 11 comprises, in particular, a chute 12 and/or a conveyor belt for feeding the stream of goods to a separation point 13. The goods are fed along a goods conveying direction 14. The separation point 13 is arranged downstream of the feed unit 11 in the goods conveying direction 14.

The stream of goods comprises first goods 15, which are shown in FIG. 1 with a circle symbol, and second goods 16, which are shown in FIG. 1 with a rectangle symbol. Identical symbols each for the first goods 15 and the second goods 16 do not mean that they are identical articles. The division into first goods 15 and second goods 16 means that the first goods 15 are admissible for loading into the conveying containers 5 of the conveying system 4 and the second goods 16 are inadmissible for loading into the conveying containers 5. The first goods 15 can be different from each other, for example different clothing items or other goods. The goods 15, 16 are randomly sorted in the stream of goods and, in particular, are not arranged separately.

At the separation point, an operator 17 ensures that the goods 15, 16 of the stream of goods are separated. In addition or as an alternative to the operator 17, automated separation at the separation point 13 is also possible, in particular by means of a corresponding handling apparatus, in particular an industrial robot. The goods 15, 16 separated at the separation point 13 are separated and conveyed separately to an identification point 19 by means of a conveyor belt 18. As a result of the separation, the goods 15, 16 are arranged one behind the other along the goods conveying direction 14 and, in particular, at a distance from one another in the goods conveying direction 14. This ensures that the goods 15, 16 can be identified sequentially at the identification point 19. An identification unit 20 is arranged at the identification point 19, which enables automated identification of the goods 15, 16. The identification unit 20 is in particular a camera, a scale and/or a reading device for reading an identification code, in particular a barcode, a QR code, an RFID chip and/or an article number.

As shown in FIG. 1, the stream of goods is divided into two partial streams of goods at the separation point 13 by the operator 17, to the left and to the right as seen from the operator 17. The goods 15, 16 of the partial stream of goods orientated to the left are placed on the conveyor belt 18 by the operator 17 and conveyed to the identification point 19 by the conveyor belt 18. The goods in the partial stream of goods orientated to the right are delivered directly to the identification point 19 by the operator 17. There is no separate conveyor belt 18 between the separation point 13 and the identification point 19 adjoining to the right. The goods 15, 16 are identified in an automated manner by the identification unit 20. For this purpose, the separated stream of goods can be stopped briefly in order to improve the reliability of the identification process. However, the identification unit 20 can also be designed in such an error-resistant manner that it is not necessary to stop the stream of goods at the identification unit 20 and the identification process is carried out in particular "as the goods 15 and 16 pass by".

In particular, the identification unit 20 is in bidirectional signal communication with a control unit 21, which is shown purely schematically. However, the identification unit 20 can also be programmed to output a "discharge" or "pass through" control signal. In this case, a unidirectional signal communication between the identification unit 20 and the control unit 21 is sufficient. The signal connection can be wired or wireless. According to the embodiment example, the signal communication is wireless, in particular by means of a radio signal.

With respect to the goods conveying direction 14, a discharge point 22 is arranged downstream of the identification point 19. The discharge point 22 is coupled to the identification point 19 in terms of conveying technology. A discharge conveying system 23 with a discharge member in the form of a transverse conveyor is arranged at the discharge point 22. The discharge conveying system 23 enables the goods 16 to be conveyed transversely along a transverse direction 24, which is orientated transversely and in particular perpendicularly to the goods conveying direction 14.

A loading point 25 is coupled to the discharge point 22 in terms of conveying technology. At the loading point 25, the loading station 10 is coupled in terms of conveying technology to the conveying system 4. In particular, a loading conveying system 26 is arranged at the loading point 25, which enables loaded conveying. In particular, the loading conveying system 26 is designed in such a manner that the goods 15 can be delivered in an automated manner into the conveying containers 5 provided at the loading point 25, i.e. can be loaded into the conveying containers 5. The loading conveying system 26 can be a chute inclined towards the conveying system 4 and/or a conveyor belt.

It is particularly advantageous if the control unit 21 is in signal communication with other components of the loading station 10 and/or the conveying system 4. In particular, the control unit 21 is in signal communication with the discharge conveying system 22, the loading conveying system 26 and/or with the conveying system 4, in particular the conveyor drive.

A discharging conveying system 27 is coupled in terms of conveying technology to the discharge conveying system 23. The discharging conveying system 27 is, in particular, a conveyor belt which is used for discharging goods 16 discharged by means of the discharge conveying system 23. In particular, the discharging conveying system 27 is orientated essentially parallel to the partial streams of goods in the loading station 10. The discharging conveying system 27 is guided in a vertical direction underneath the feed unit 11. This arrangement is particularly compact and space-saving. Of course, other embodiments and/or arrangements of the discharging conveying system 27, in particular with respect to the feed unit 11, are also possible.

In the following, a loading method for the conveying containers 5 using the loading station 10 is explained in more detail with reference to FIG. 1.

A mixed stream of goods with first goods 15 and second goods 16 is fed along the goods conveying direction 14 to the separation point 13 by means of the feed unit 11. The operator 17 and/or a handling apparatus not shown separates the goods 15, 16. In particular, the separated goods 15, 16 are delivered to the conveyor belt 18 and then to the identification point 19 and/or directly to the identification point 19. At the identification point 19, the goods 15, 16 are automatically identified. The identified goods are automatically classified into first goods 15, which are admissible for loading the conveying containers 5, and second goods 16, which are inadmissible for loading the conveying containers

5. Classification is carried out in an automated manner, in particular by means of the control unit 21.

The separated stream of goods is conveyed along the goods conveying direction 14 to the respective discharge point 22. The first goods 15 pass the discharge point 22 to the loading point 25. The second goods 16 are discharged at the discharge point 22 by means of the discharge conveying system 23 in the transverse direction 24 onto the discharging conveying system 27. For this purpose, the discharge conveying system 23 receives a corresponding control signal generated by the control unit 21. The control signal is generated in the control unit 21 on the basis of the data transmitted by the identification unit 20. The discharged second goods 16 are conveyed by the discharging conveying system 27, in particular away from the loading station 10. The discharged second goods 16 are in particular sorted, in particular manually and/or by means of a suitable automatic sorting system. The sorted second goods 16 can in particular be stored again and/or returned to the incoming goods zone 2, for example. If the second goods 16 are inadmissible because they cannot yet be processed in the currently active wave, but are in principle suitable for conveying in the conveying container 5, in particular at a later time, these second goods 16 can, for example, be temporarily stored in a buffer device provided for this purpose and fed to the separation point 13 again at a later time.

The stream of goods thinned out by the second goods 16 at the loading point 25 comprises exclusively first goods 15. The first goods 15 are delivered in an automated manner into the conveying containers 5 at the loading point 25, in particular by means of the loading conveying system 26. For the loading process, the conveying containers 5 are rotated in particular into a loading position that is rotated by 90° relative to the transport position with respect to a vertical axis. In the loading position, loading of the conveying containers 5 is simplified and, in particular, possible without errors. At least one and in particular exactly one first product 15 is loaded into each of the conveying containers 5. It is also possible to transport a plurality of first goods 15 per conveying container 5. The various conveyor strands of the conveying system can be brought together again downstream of the loading station 10, in particular upstream of the buffer store 8, the sorting device 9 and/or the packing places.

After loading, the conveying containers 5 are rotated back into the transport position by 90° with respect to the vertical axis.

What is claimed is:

1. A loading method for conveying containers with goods from a stream of goods, the method comprising:

feeding the stream of goods to a separation point, wherein the stream of goods includes first goods and second goods, wherein the first goods are admissible for loading into the conveying containers, and wherein the second goods are inadmissible for loading into the conveying containers;

separating the goods;

automatically identifying the separated goods;

discharging the second goods from the stream of goods; and loading the conveying containers with the first goods, wherein the conveying containers to be loaded are each loaded with exactly one first product, and wherein the conveying containers are hanging bags which are transported in a suspended manner in an overhead conveyor facility.

2. The loading method of claim 1, wherein the loading is carried out in an automated manner.

3. The loading method of claim 2, wherein the loading is controlled by a control unit.

4. The loading method of claim 1, wherein the first goods are delivered to the conveying containers via a loading conveying system.

5. The loading method of claim 1, wherein the conveying containers to be loaded are positioned at a loading point.

6. The loading method of claim 5, wherein the conveying containers to be loaded are automatically opened.

7. The loading method of claim 1, wherein the separating is carried out manually.

8. The loading method of claim 1, wherein the automatically identifying includes classifying on the basis of an identification code.

9. A loading method for conveying containers with goods from a stream of goods, the method comprising:

feeding the stream of goods to a separation point, wherein the stream of goods includes first goods and second goods, wherein the first goods are admissible for loading into the conveying containers, and wherein the second goods are inadmissible for loading into the conveying containers;

separating the goods;

automatically identifying the separated goods;

automatically classifying the identified goods, wherein the automatically classifying includes classifying on the basis of goods characteristics, wherein the goods characteristics are at least one selected from the group consisting of dimension and mass;

discharging the second goods from the stream of goods; and loading the conveying containers with the first goods.

10. The loading method of claim 8, wherein the identification code is at least one selected from the group consisting of a barcode, QR code, and a readable memory chip.

11. The loading method of claim 1, wherein the discharging the second goods from the stream of goods is carried out in an automated manner.

12. The loading method of claim 1, further including conveying via a discharge conveying system the discharged second goods.

13. A loading station for conveying containers, the loading station comprising:

a feed unit for feeding a stream of goods comprising first goods and second goods, wherein the first goods are admissible for loading into the conveying container and wherein the second goods are inadmissible for loading into the conveying container;

a separation point for separating the goods, arranged downstream of the feed unit in a goods conveying direction;

an identification point with an identification unit for the automated identification of separated goods;

a discharge point for discharging the second goods from the stream of goods; and a loading point coupled to the discharge point for loading the conveying containers with the first goods, wherein the conveying containers to be loaded are each loaded with exactly one first product, and wherein the conveying containers are hanging bags which are transported in a suspended manner in an overhead conveyor facility.

14. The loading station of claim 13, wherein the identification point is coupled to the separation point.

15. The loading station of claim 13, comprising a discharge conveying system arranged at the discharge point for the automated discharge of the second goods.

16. The loading station of claim 13, further comprising a loading conveying system arranged at the loading point for automated delivery of the first goods into the conveying containers.

17. The loading station of claim 13, further comprising a control unit in signal communication with the identification unit.

\* \* \* \* \*